United States Patent [19]

Moline

[11] 4,285,329

[45] Aug. 25, 1981

[54] FRICTION HEAT GENERATOR

[76] Inventor: George A. Moline, 8 Glenwood Dr., Ballston Lake, N.Y. 12019

[21] Appl. No.: 973,005

[22] Filed: Dec. 26, 1978

[51] Int. Cl.³ ................................................ F24C 9/00
[52] U.S. Cl. .................................................. 126/247
[58] Field of Search ........................... 126/247; 122/26

[56] References Cited

U.S. PATENT DOCUMENTS

| | | | |
|---|---|---|---|
| 2,226,423 | 12/1940 | Blake | 122/26 |
| 2,251,344 | 8/1941 | Tesch | 122/26 |
| 2,625,929 | 1/1953 | Love et al. | 126/247 |
| 2,764,147 | 9/1956 | Brunner | 126/247 |
| 3,164,147 | 1/1965 | Love et al. | 126/247 |
| 3,813,036 | 5/1974 | Lutz | 126/247 X |
| 4,114,809 | 9/1978 | Sampson | 122/26 X |

*Primary Examiner*—Stephen P. Garbe
*Attorney, Agent, or Firm*—Heslin & Watts

[57] ABSTRACT

An improved friction heat generator of the type having stationary and rotatable friction disc assemblies with a thin fluid film there between, driven by either a variable or constant power source. In either case, the disc interface pressure, which is perpendicular to the disc surfaces, is hydraulically regulated by an oil pump so that it is proportional to the rate of rotation of the generator's drive shaft. The heat generator incorporates an air compressor, to convert driving power energy into compressed air energy when the driving power is below the threshold level required to generate a useful quantity of heat output. The compressed air is stored in a storage cylinder. Hydraulic means are provided to deactivate air compression while the driving power energy is at or above the threshold level required to generate a useful quantity of heat output. Heating chambers are within each disc assembly. Heat transfer fluid is circulated so that it must pass through the heating chambers of each disc assembly. The rate of circulation of the heat transfer fluid is regulated so that it is proportional to the quantity of heat being generated in the heating chambers.

45 Claims, 14 Drawing Figures

FRICTION HEAT GENERATOR

BACKGROUND OF THE INVENTION

The invention relates to friction heat generators of the type having stationary and rotatable friction discs with a thin fluid film between the discs. Disc interface pressure is created perpendicular to the disc surfaces, and heat is generated by the shearing of the thin fluid film.

The quantity of heat generated in a friction heat generator is dependent, in part, on the total surface area of the thin fluid film, the rotational velocity of the moving discs in relation to the stationary discs, and the disc interface pressure. The quantity of heat generated increases as each of these variables increase. Heat transfer fluid is provided to pick up heat while flowing through heating chambers located within each disc.

Friction heat generators are well known. It has been found that such friction heat generators as heretofore constructed generally operate with a constant predetermined value of interface pressure between the friction discs. In one prior art device, the disc interface pressure is changed only by manual adjustment of a spring. This adjustment, however, is generally not made while the generator is operating.

At any given disc interface pressure, the generator's running torque is relatively constant, and the quantity of heat produced in a given period of time is dependent on a single function: that being the rotational velocity of the disc assemblies. Such heat generators operate with either low starting and running torque and consequently relatively low quantity of heat output even when high power input is available; or higher starting and running torque and no useful heat output when only low levels of power input are available. These characteristics of the heat generator do not permit high efficiency operation over a broad range of power input.

Regardless of whether prior friction heating generators operated with low or high starting and running torque, these prior devices had no alternative provisions for the use of driving power at levels below that required to generate a useful quantity of heat output. For instance, one of these prior friction heat generators could be driven by a windmill or other variable power source. On a day with only a light wind, the windmill would not supply enough power to overcome the starting or running torque and therefore no heat would be generated. The wind power, from such light wind would be lost.

It would be advantageous to provide an auxiliary apparatus to store the energy from a light wind, and then to release it back into the friction heat generator system at a time when a stronger wind was blowing.

Another disadvantage of friction heating generators, as heretofore constructed, is that they permit a significant volume of the circulating heat transfer fluid to bypass some of the friction disc assemblies without ever passing through or near heat producing surfaces. The fluid, therefore, is heated only indirectly by mixing with the high temperature fluid discharged from the heating chambers.

Additionally, in the older devices, loss of fluid in the generator for any reason results in very rapid heating of the discs and potentially serious damage to them unless the driving power to the generator is withdrawn almost immediately.

Prior friction heating generators had no means to automatically increase the flow of heat transfer fluid as the quantity of heat generated increases.

It would therefore be advantageous to provide means for automatically increasing the flow of heat transfer fluid through the heat generator, as the heat output of the generator is increasing.

It would also be advantageous to provide means for automatically increasing the friction disc interface pressure, as the driving power input to the generator is increasing.

SHORT STATEMENT OF THE INVENTION

It is an object of this invention to provide a friction heat generator which operates efficiently over a wide range of input power, which incorporates automatic variation of disc interface pressure and which automatically regulates the volume of fluid flowing through the generator; thereby regulating heat generation and transfer so as to be closely proportional to the driving power energy over a wide range of input energy availability.

Another object of this invention is to provide means to vary the disc interface pressure utilizing hydraulic or pneumatic means.

A further object of this invention is to automatically convert generator driving power, which is below the threshold power level required to generate useful heat output, to compressed air energy and then to store this compressed air.

Yet another object of this invention is to provide a fluid pumping capability, which is responsive to heat generator driving power. Since the quantity of heat generated is proportional to the driving power, this capability assures that the quantity of heat capable of being transported by the heat transfer fluid is responsive to the heat output from the generator.

Another object of this invention is to provide a friction heat generator capable of full and complete operation utilizing a single variable source of energy such as wind or falling water.

A further object of this invention is to provide a heat generator capable of functioning automatically and unattended for long periods of time.

Yet another object of this invention is to provide a friction heat generator with high efficiency heat generation utilizing a construction arrangement of stationary and rotatable friction disc assemblies such that all of the heat transfer fluid, circulating through the heat generator, passes through each disc assembly and comes into direct contact with at least one of each pair of rotatable discs and with at least one of each pair of stationary discs. This assures rapid heat transfer from the point of heat generation of the disc interface, through the discs, and into the circulating heat transfer fluid.

A further object of this invention is to provide automatic protective features to prevent or minimize damage to the heat generator in the event of loss of fluid in the circulation system.

The invention is an improved friction heat generator where heat is created by the shearing of a thin fluid film located between rotating and stationary friction discs. The circulating fluid, for picking up the heat generated and transferring it to another location (heat transfer fluid), is preferably the same as the fluid being sheared to generate heat. This fluid is typically oil. Means are provided for regulating the friction disc interface pressure proportionally to the power input driving the generator's drive shaft. This pressure regulating means is preferably an oil pump, powered by the generator drive shaft, thereby creating hydraulic pressure proportional to the power input driving the generator drive shaft. This hydraulic pressure is then sent through a pressure sensitive regulator to a piston. The piston is in contact with the array of discs, and it transforms the hydraulic pressure into disc interface pressure.

An air compressor and storage cylinder are incorporated in the generator to convert and store driving power energy which is below the level required to generate useful heat.

The air compressor is driven by a cam on the end of the generator's drive shaft. The air compressor is automatically disengaged from the cam by a hydraulic/mechanical arrangement when a predetermined hydraulic pressure value is reached. The hydraulic pressure is generated by the oil pump mentioned above, and the predetermined hydraulic pressure value is selected to correspond with the point where the driving power energy reaches the level where useful heat can be generated by the friction discs.

Heating chambers are located within each disc assembly adjacent to each friction disc. The arrangement and configuration of the disc assemblies is such that all the oil circulating through the heat generator must pass through each disc assembly.

Automatic control of heat transfer fluid circulation is provided by the oil pump, which runs off the generator drive shaft, so that the quantity of heat transported by the fluid is responsive to the heat output from the generator.

DETAILED DESCRIPTION OF THE INVENTION

Figure 1:
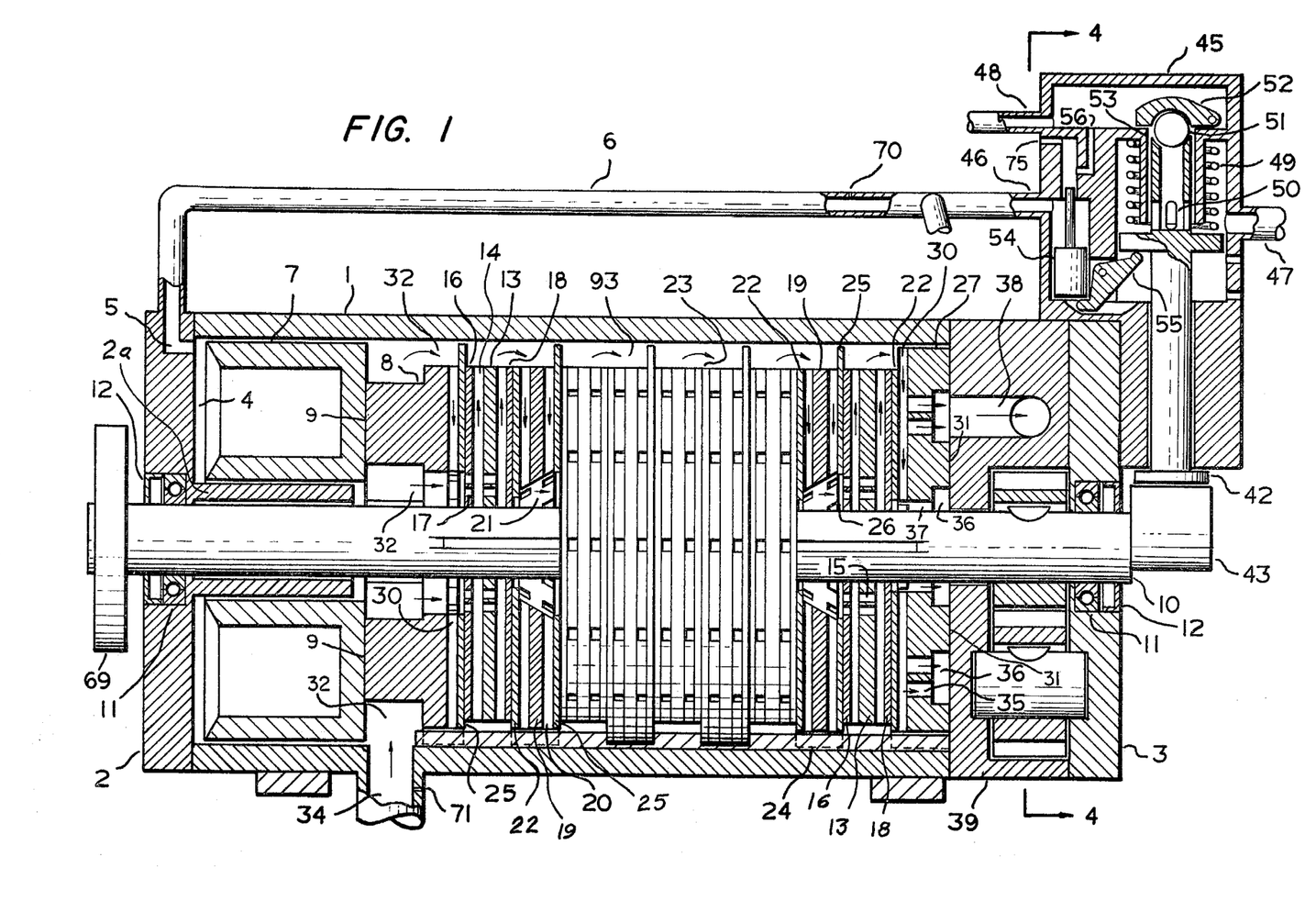
FIG. 1 is a side view partly in central vertical section of the friction heat generator, illustrating the heating chambers, pressure chamber, oil pump and air compressor embodying the present invention. The central portion of this figure shows friction discs and backing plates in a side elevation view, not in section, with the cylinder wall removed.
Figure 3:
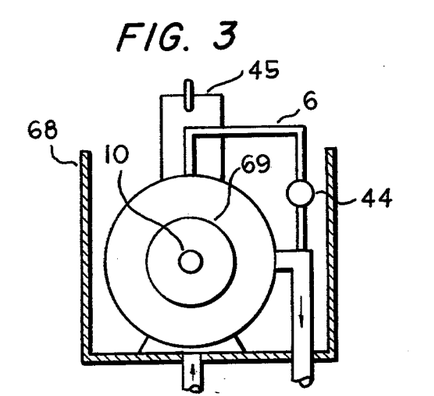
FIG. 3 is a reduced front end view of the friction heat generator shown in FIG. 1 with the front of the tank removed.

Referring now to the drawings, it can be seen in FIGS. 1 and 3 that the friction heat generator includes a cylindrical casing with side wall 1 and front end wall 2 mounted on the front of side wall 1. The housing of an oil pump 39, which will be described below, can conveniently serve as an extension of cylindrical side wall 1. Rear end wall 3 is mounted on the back of oil pump 39. Side wall 1 is preferably cylindrical, but need not be.

The front end of the casing forms an annular pressure chamber 4 bounded by front end wall 2 and by side wall 1. Note the sleeve 2a on end wall 2 which bounds the inside of annular chamber 4. An opening 5 in front end wall 2 provides means for communication between pressure chamber 4 and hydraulic pressure transmitting piping 6. An annular piston 7 is slideably mounted around sleeve 2a in pressure chamber 4 for movement axially along side wall 1. Piston 7 could be replaced by a bellows or a diaphragm (neither of which are shown).

A drive shaft 10 is rotatably mounted in end walls 2 and 3. It is journaled in suitable bearings 11 in end walls 2 and 3 with suitable oil seals 12 between said shaft 10 and end walls 2 and 3. A number of friction disc assemblies are mounted on or surround the drive shaft. Some of these assemblies are keyed to and, therefore, rotate with the drive shaft. Others are keyed to the side wall and therefore remain stationary. All of these assemblies, however, are free to slide axially along the drive shaft. A typical rotatable friction disc assembly is depicted in FIG. 1 as being comprised of a rotatable inlet friction disc 16, a rotatable discharge friction disc 18 and a rotatable backing plate 13. It can be seen that rotatable backing plate 13 is sandwiched between the friction discs 16 and 18 and provides support. As will be more fully appreciated hereinafter, the general flow of heating fluid is from left to right through the generator shown in FIG. 1. Friction discs on the upstream side have been designated as "inlet" discs while those on the downstream side have been designated as discharge discs.

Adjacent to each rotatable disc assembly is a stationary disc assembly. Each stationary disc assembly comprises a stationary backing plate 19 sandwiched between a stationary inlet friction disc 22 and a stationary discharge friction disc 25. Each of these assemblies is mounted about, but not keyed to, drive shaft 10. They are, however, slideably keyed to cylinder wall 1, thereby making them rotationally stationary with respect to shaft 10, but axially movable along it.

Figure 5:
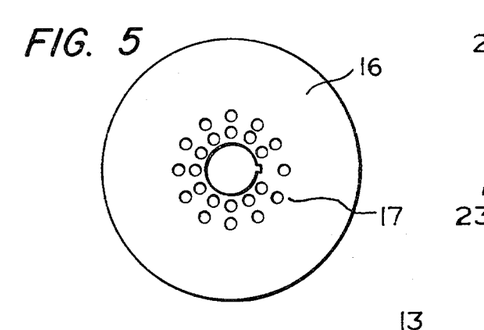
FIG. 5 is a reduced end view of a rotatable inlet friction disc.
Figure 6:
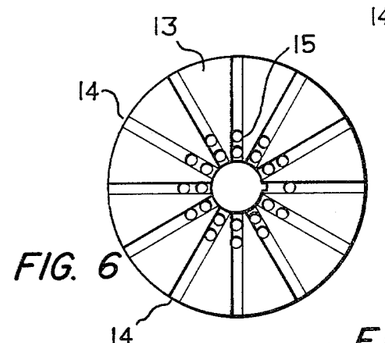
FIG. 6 is a reduced view of a rotatable backing plate.
Figures 7, 11, 12:
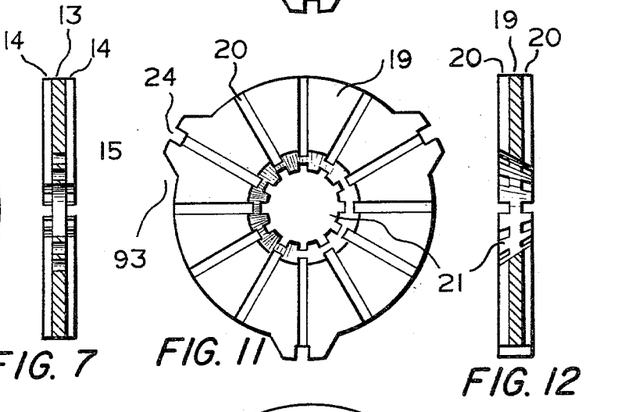
FIG. 7 is a reduced central vertical section side view of the rotatable backing plate shown in FIG. 6.
FIG. 11 is a reduced end view of a stationary backing plate.
FIG. 12 is a reduced central vertical sectional side view of a stationary backing plate shown in FIG. 11.
Figure 8:
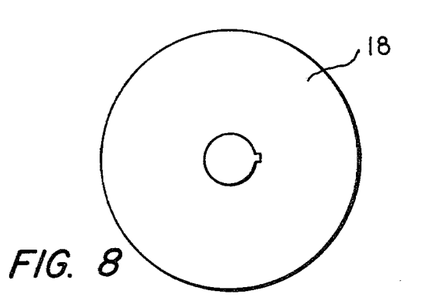
FIG. 8 is a reduced end view of a rotatable discharge friction disc.

Examining the disc assemblies in more detail, rotatable inlet friction disc 16, shown in FIG. 5, has a plurality of inner passages in the form of holes 17 adjacent to the inner diameter of said disc, which pass completely through the disc. Rotatable backing plate 13, shown in FIGS. 6 and 7, has a plurality of radial channels 14 on both faces and inner passages in the form of holes 15 which pass completely through the plate. These radial channels are heating chambers. Holes 15 and channels 14 in backing plate 13 communicate with each other and communicate with holes 17 in inlet friction disc 16 when both are mounted together on drive shaft 10. Rotatable discharge friction disc 18, shown in FIG. 8, has no holes or channels. All three of the above components of each rotatable disc assembly fit tightly around drive shaft 10, but are spaced apart from side wall 1 when mounted therein. The net effect of this configuration is that fluid entering through holes 17 of rotatable inlet friction disc 16 will pass into channels 14 on both sides of rotatable backing plate 13. Channels 14 in cooperation with the two rotatable friction discs constrain the fluid to flow radially outward through the channels, wherein the fluid emerges from the channels at the circumference of the assembly.

Figure 10:
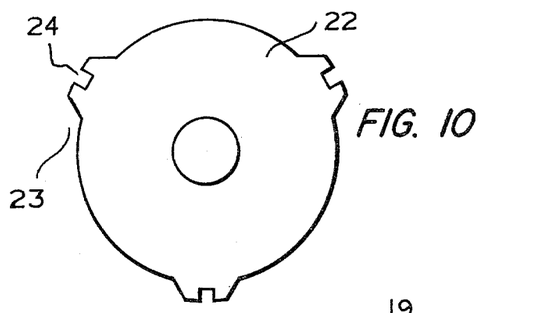
FIG. 10 is a reduced end view of a stationary inlet friction disc.
Figure 13:
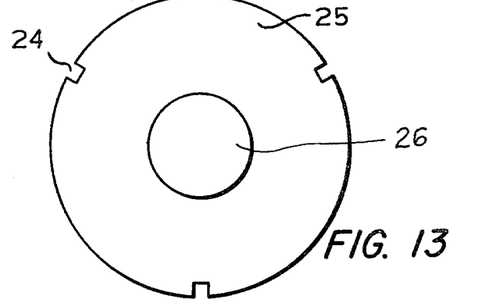
FIG. 13 is a reduced end view of a stationary discharge friction disc.

Stationary inlet friction disc 22, shown in FIG. 10, has an inner diameter slightly larger than that of drive shaft 10. Outer passages 23, between the key slots 24 and side wall 1 are formed when this disc is mounted therein. These passages are, of course, nothing more than spaces between the disc 22 and side wall 1. Stationary backing plate 19, shown in FIGS. 11 and 12, has a plurality of radial channels 20 on both faces. These radial channels 20 are heating chambers. The inner diameter of stationary backing plate 19 is larger than drive shaft 10, thereby forming an inner passage 21. Outer passages 93, between key slots 24 and side wall 1 are formed when the backing plate is mounted thereon. Again, this passage is merely the space between backing plate 19 and side wall 1. Stationary discharge friction disc 25, shown in FIG. 13, has an inner diameter larger than the drive shaft 10, forming an inner passage 26, and has key slots 24 on the outer circumference. Stationary discharge friction disc 25 is mounted to fit tightly on side wall 1 so that no outer passage or space is present.

When a stationary disc assembly is mounted within cylinder wall 1, outer passages 23, created by stationary inlet friction disc 22, communicate with outer passages 93, of stationary backing plate 19. Outer passages 93 and inner passages 21 of stationary backing plate 19 communicate with each other via radial channels 20. Inner passages 21 of stationary backing plate 19, communicate with inner passage 26, of discharge friction disc 25. The net effect of this configuration is that fluid entering at the circumferential ends of slots 20 will pass toward the shaft 10 and through inner passage 21 and 26 to holes 17 of disc 16 of the rotatable disc assembly to the right, as shown in FIG. 1.

As mentioned before, channels 14, in rotatable backing plates 13, and channels 20, in stationary backing plates 19, comprise the heating chambers. These channels provide a large surface area for the heat transfer fluid to contact the hot friction discs 16, 18, 22 and 25 and thereby remove heat.

The reader can now appreciate that the invention utilizes an alternating series of rotatable disc assemblies and stationary disc assemblies in frictional contact with one another. At the right end of this series, a pressure plate 27 is slideably keyed into side wall 1. A plurality of channels 30 are formed in pressure plate 27 in number and configuration similar to the radial channels 14 and 20 in rotatable backing plates 13 and stationary backing plates 19 respectively, as shown in FIGS. 6 and 7, 11 and 12. A series of holes 35 through pressure plate 27 are arranged concentrically and each communicates with radial channel 30 on one end while communicating with passage 36 on its other end. The inner end of radial channels 30 communicate with passage 36 through annular passage 37 created by the inner diameter of pressure plate 27 and drive shaft 10. Raised bosses 31 on pressure plate 27 extend through passage 36 and provide axial support for pressure plate 27. A stationary inlet friction disc 22 is keyed in side wall 1 between pressure plate 27 and the rotatable discharge friction disc 18 to its immediate left, as shown in FIG. 1.

Looking now at the left end of the series of disc assemblies, it is seen that raised bosses 9 on pressure plate 8, which is slideably keyed in side wall 1, are in contact with piston 7. A series of channels 30 are formed in pressure plate 8 similar in number and configuration to those formed in pressure plate 27. A stationary discharge friction disc 25 is keyed in side wall 1 between pressure plate 8 and the first rotatable disc assembly to its immediate right, as shown in FIG. 1.

The rotatable and stationary friction discs are forced into frictional contact with each other by pressure plates 8 and 27. Passage 32 is bounded by pressure plate 8, side wall 1, piston 7, stationary discharge friction disc 25, sleeve 2a and drive shaft 10.

Both the combination of stationary discharge friction disc 25 and pressure plate 8, and the combination of stationary inlet friction disc 22 and pressure plate 27 comprise pressure plate assemblies. Channels 30, in pressure plates 8 and 27, are also heating chambers. These channels, too, provide a large surface area for the heat transfer fluid to contact the hot friction discs, and to thereby remove heat.

In operation, drive shaft 10 is rotated by some external power source such as a wind or falling water. Heat transfer fluid is introduced into the casing at casing inlet 34 and enters passage 32. The fluid then flows through passage 32, some fluid flows radially inward through channels 30 of pressure plate 8 picking up heat from the adjacent stationary discharge friction disc 25, and the balance of the fluid flows between pressure plate 8 and drive shaft 10. The fluid then passes through inner passage 26 in disc 25 and through holes 17 in rotatable inlet friction disc 16.

Some fluid flows radially outward through channels 14 on the inlet face of rotatable backing plate 13, the balance continues to pass through inner passages 15 in rotatable backing plate 13 until it reaches rotatable discharge friction disc 18 which is solid and tightly fit around drive shaft 10. At this point, the balance of the fluid must also flow radially outward through channels 14 on the discharge face of backing plate 13. Note that the rotation of backing plate 13 promotes this flow and ultimately causes the fluid to be discharged from the channels at their circumferential ends. Traveling through channels 14, the fluid picks up heat from both rotatable discs 16 and 18.

When the fluid exits channels 14, it travels in the outer passage until it is blocked by the two stationary discharge friction discs 25 which are solid and tightly fit against side wall 1. Consequently, the fluid must flow down channels 20 in stationary backing plate 19. While traveling through channels 20, the fluid picks up heat from both stationary friction discs 22 and 25.

When the fluid exits channels 20, its flow is blocked to the left (in FIG. 1) by the solid rotatable discharge friction disc 18. Therefore, the heat transfer fluid flows through inner passage 21 of stationary backing plate 19 and flows out inner passage 26 formed by stationary discharge friction disc 25. The fluid must enter the next rotatable disc assembly through holes 17 in its inlet friction disc. Then the flow pattern just described is repeated until the heat transfer fluid passes through each and every heating chamber in the entire series of rotatable and stationary disc assemblies. In its final course, the fluid exits the last rotatable backing plate 13, passes over the final rotatable discharge friction disc 18, passes through outer passages 23 of stationary inlet friction disc 22 and then passes through channels 30 of pressure plate 27, where the fluid picks up heat from the last stationary friction disc 22. The heat transfer fluid travels either through holes 35 or passage 37 to passage 36 and thereby reaches intake port 38 in the oil pump 39.

Figure 9:
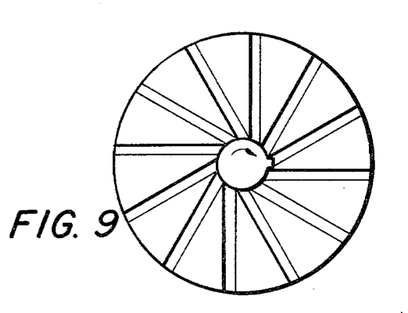
FIG. 9 is a reduced end view of a modified pattern for radial channels for both rotatable and stationary backing plates shown in FIGS. 6 and 11.
Figure 14:
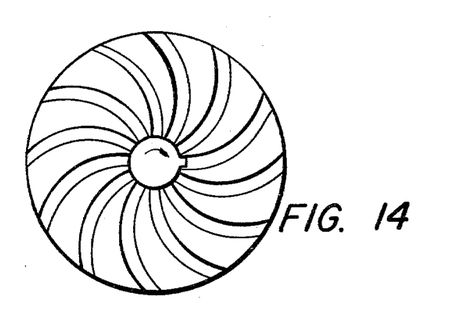
FIG. 14 is a reduced end view of a modified pattern for radial channels for both rotatable and stationary backing plates shown in FIGS. 6 and 11.

As mentioned above, the rotation of the rotatable disc assemblies centrifugally forces the fluid, which enters at the axial ends of these assemblies, to flow radially through channels 14 and out at their circumferential ends. This inherent pumping action can be increased by modifying the shape of channels 14. FIGS. 9 and 14 show two of such modified patterns in rotatable backing plate 13. FIG. 9 illustrates offset radial channels and FIG. 14 illustrates curved radial channels.

Although the stationary disc assemblies and pressure plate assemblies do not rotate and therefore do not create fluid flow, the modified patterns of FIGS. 9 and 14 may also be used in stationary backing plate 19 and in pressure plate 27. These configurations will minimize the resistance encountered against the angular, or circular component of the fluid flow.

Interfacial pressure between adjacent stationary and rotatable friction discs is regulated through the action of hydraulic or pneumatic pressure on piston 7. Piston 7 transmits this pressure to the pressure plates, which further transmit the pressure to the friction discs.

Figure 4:
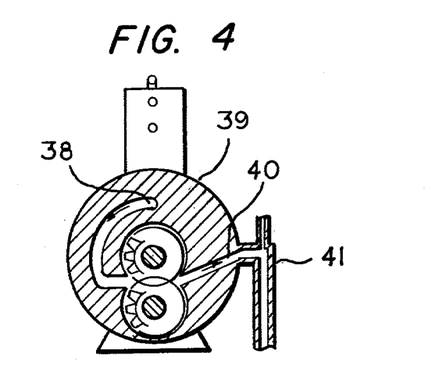
FIG. 4 is a reduced sectional end view on line 4—4 of FIG. 1.

Thus, fluid pressure generating means must be provided to generate either hydraulic or pneumatic pressure. Hydraulic pressure is preferred and this is generated preferably by an oil pump. Oil pump 39, shown in FIG. 4, is a gear pump. However, a centrifugal or piston operated pump will suffice. Oil pump 39 is driven by the primary power source either directly by drive shaft 10 (preferably), or it may be mounted separately and driven indirectly. Oil pump 39 is driven at the same speed as drive shaft 10 or at any speed which is proportional to the speed of drive shaft 10 thereby generating hydraulic pressure directly proportional to the magnitude of the primary power source. Oil pump 39 has an intake port 38 communicating with passage 36 in pressure plate 27 and it has a discharge port 40, as shown in FIG. 4, connected to various other piping.

Figure 2:
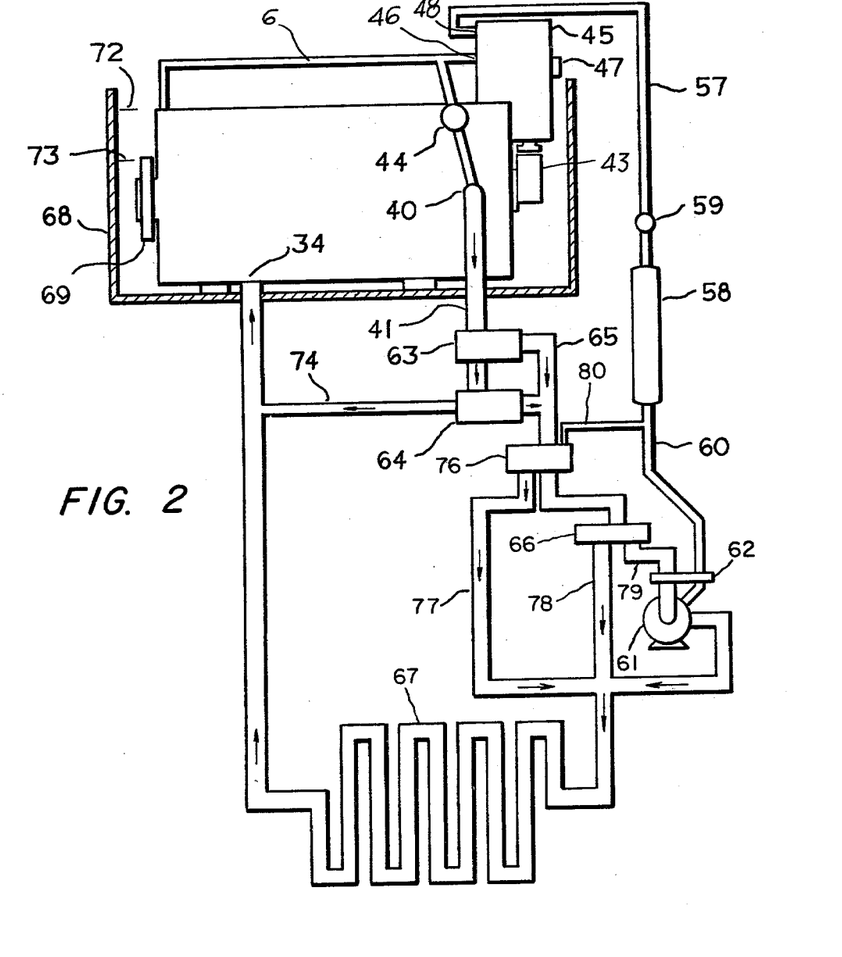
FIG. 2 is a schematic diagram of the complete friction heat generator system.

Referring to FIG. 2, hydraulic pressure transmitting piping 6 connects discharge port 40 with pressure regulator 44, which is then connected to both opening 5 in end wall 2 (FIG. 1) and to connection 46 in air compressor 45. Pressure regulator 44 blocks the flow of fluid until a predetermined minimum value of hydraulic pressure is reached. Regulator 44 also acts to limit the maximum pressure of the fluid leaving the regulator to a predetermined maximum hydraulic pressure. The hydraulic pressure exiting regulator 44 is communicated through piping 6 and opening 5 to pressure chamber 4 wherein it presses piston 7 against pressure plate 8. In this manner, the hydraulic pressure generated by oil pump 39 is communicated to the friction disc assemblies, thereby urging the disc assemblies closer together and also creating friction disc interface pressure.

It will be appreciated that, by means of the apparatus just described, friction disc interface pressure will vary directly with the rotational velocity of the drive shaft 10.

When the friction heat generator of the instant invention is being driven by a variable power source, such as wind or falling water, there are likely to be times when the driving power input is too low to generate heat but is sufficient to overcome the heat generator's starting and/or running torque. Rather than allowing this low level of driving power input to be completely lost, the instant invention utilizes such low power input for gas compression. The compressed gas is stored and later returned to the system when it can be utilized efficiently.

Gas compression is provided by air compressor 45, shown in FIGS. 1 and 2, which is driven by the primary power source directly via drive shaft 10. Air compressor 45 has a hydraulic pressure connection 46, ambient air intake port 47 and compressed air outlet 48. Compressed air is generated by piston 42 operating in cylinder 53 and driven on the compression stroke by the cam 43 on drive shaft 10. Piston 42 is driven by spring 49 on the intake stroke. Piston 42 has air intake port 50 and ball valve 51. Air compressor 45 has a check valve 52 to close the cylinder 53 on the intake stroke and to open cylinder 53 on the compression stroke.

A regulator piston 54 operates rocker arm 55 and simultaneously opens or closes the air chamber bleed off ports 56 and 75. Regulator 44 controls the hydraulic pressure from oil pump 39 to piston 54. No hydraulic pressure is communicated to piston 54 until the heat generator's driving power reaches a threshold level where it will generate a useful quantity of heat output. When this predetermined hydraulic pressure value is reached, the hydraulic pressure causes piston 54 to depress rocker arm 55 thereby raising the compressor piston 42 off of cam 43. This ceases further air compression.

Air compressor 45 has a single compression cylinder but may be made with multiple compression cylinders arranged in single or multiple compression stages.

As shown in FIG. 2, compressed air outlet 48 communicates with storage cylinder 58 via air piping 57. Storage cylinder 58 is provided for storing the compressed gas generated by the air compressor. A suitable check valve 59 is installed along air piping 57 between compressor 45 and cylinder 58.

Air piping 60 connects storage cylinder 58 and oil booster pump 61. Oil booster pump 61 is driven by a built-in air motor. A suitable air flow valve 62 is installed in between cylinder 58 and pump 61, in piping 60. The air motor, in pump 61, is provided to convert compressed gas energy into mechanical energy, so as to drive pump 61.

The heat transfer fluid circulation system for transporting heat from the generator to a place where it is needed, is also shown in the schematic diagram of FIG. 2. Fluid is pumped through the discharge port 40, of oil pump 39, into pipe 41. The fluid flow passes through high temperature thermostat 63 to low temperature thermostat 64. When a preselected temperature is reached, high temperature thermostat 63 opens to an additional hydraulic connection 65 which bypasses low temperature thermostat 64 and enables fluid flow to pass directly to air pressure sensing valve 76.

At relatively low temperatures, high temperature thermostat 63 causes all fluid to flow to low temperature thermostat 64. Low temperature thermostat 64 normally directs the fluid flow through piping 74 immediately back to casing inlet 34, for reheating. However, when a predetermined oil temperature is reached, low temperature thermostat 64 redirects the fluid flow to the air pressure sensing valve 76.

Air pressure sensing valve 76 is sensitive to the air pressure in storage cylinder 58 via air piping 80. When air pressure within cylinder 58 is below a predetermined value, then air pressure sensing valve 76 directs fluid flow immediately to heat exchanger coil 67 through piping 77. However, when air pressure in storage cylinder 58 is above a predetermined value, then air pressure sensing valve 76 directs fluid flow to thermostat 66. Thermostat 66 normally directs fluid flow immediately to heat exchanger coil 67 through piping 78. However, when oil temperature is above a predetermined value, thermostat 66 directs fluid flow to booster pump 61. Then oil temperature sensing device in air flow valve 62 opens air flow valve 62 thereby enabling pressurized air from storage cylinder 58 to supply power to operate booster pump 61 via air piping 60. Thus, oil booster pump 61 is powered to assist in circulating the fluid flow.

If either the oil temperature or the air pressure fall below their respective predetermined values, then devices 66, 76 and 62 will shut off both the flow of fluid and the flow of compressed air to booster pump 61.

Heat exchanger coil 67 is installed in the oil circulation system to facilitate useful extraction of the heat generated by the friction heat generator. After passing through heat exchanger coil 67, the heat transfer fluid returns to casing inlet 34 for recirculation through the heating chambers. Suitable oil flow temperature and pressure gauges (not shown) provide means to monitor friction heat generator operation. Suitable oil filtration means (not shown) maintains the cleanliness of the oil.

The tank 68 shown in FIG. 2 provides a receptacle for partial or complete fluid immersion of the apparatus included in FIG. 1. Such immersion assures lubrication of the coupling device 69, between the primary drive power and the heat generator drive shaft 10, and of the cam 43. Immersion also assures containment of leakage from the drive shaft oil seals 12 and provides corrosion protection. A small hole 70 at the highest point in the hydraulic pressure piping 6 (see FIG. 1) allows continuous self purging of air in the closed oil circulating system. The small volume of oil exiting from hole 70 after all the air is purged falls harmlessly into tank 68. A similar hole 71 in casing inlet 34 (see FIG. 1) provides a means for fluid to enter the circulation system to make up for fluid loss through hole 70 and minor leakage anywhere else in the system. The fluid level in tank 68 is maintained between a maximum level 72 and the minimum level 73 shown in FIG. 2.

High temperature thermostat 63, low temperature thermostat 64, air pressure sensing valve 76, thermostat 66, air flow valve 62, booster pump 61, pressure regulator 44, check valve 59, storage cylinder 58 and heat exchanger coil 67 are all of conventional design and are commercially available units.

Automatic system operation when driven by a variable power source will now be described. A typical, but not exclusive, power source is wind energy.

During periods of zero driving power, the heat generator is at rest, fluid is not circulating, hydraulic pressure in all piping is zero and therefore the friction disc interface pressure is zero and the air compressor piston 42 is in contact with cam 43 (by action of spring 49). The fluid temperature is relatively low and therefore both the high and low temperature thermostats 63 and 64 are open for fluid flow through pipe 74 to casing inlet 34. If air pressure in storage cylinder 58 is below a predetermined value, air pressure sensing valve 76 is open to fluid flow through piping 77. If air pressure in storage cylinder 58 is above the predetermined value, air pressure sensing valve 76 is open to fluid flow to thermostat 66. The fluid temperature is relatively low and therefore thermostat 66 is open to fluid flow through piping 78 and closed to fluid flow through piping 79 to oil booster pump 61. Air flow valve 62 is closed.

As the driving power begins, starting torque consisting of bearing 11 friction, fluid friction, shaft 10 inertia and coupling losses is overcome, and drive shaft 10 commences to rotate causing air compressor piston 42 to reciprocate by the action of cam 43. Compressed air is generated and sent to storage tank 58.

At the same time oil pump 39, also powered by drive shaft 10, begins to generate hydraulic pressure at discharge port 40. Fluid begins to flow through the high and low temperature thermostats through pipe 74 and back to casing inlet 34.

As the driving power increases further, oil pump 39 generates increased hydraulic pressure and when a predetermined hydraulic pressure value is reached, regulator 44 directs this hydraulic pressure to piping 6. This predetermined pressure value is selected to correspond with the lowest value of driving power input at which a useful quantity of heat can be generated. The hydraulic pressure forces piston 54 to extend thereby opening air pressure bleed off ports 56 and 75 and forcing rocker arm 55 to raise air compressor piston 42 off cam 43, and thus air compression ceases.

At the same time, the hydraulic pressure in piping 6 is transmitted to pressure chamber 4 through opening 5, in end wall 2, and the pressure forces piston 7 against pressure plate 8. Thus, friction disc interface pressure is created and heat generation commences from shearing the thin oil film between the rotating and stationary friction discs.

When the rising oil temperature reaches a predetermined value, low temperature thermostat 64 switches the fluid flow to air pressure sensing valve 76 and, dependent on the air pressure value in storage tank 58, fluid flow will be directed to either heat exchanger coil 67 or thermostat 66 as will be described below.

As the driving power further increases, oil pump 39 generates even higher hydraulic pressure in pressure chamber 4 thereby further increasing friction disc interface pressure for increased heat production and efficiency. However, pressure regulator 44 limits the hydraulic pressure in piping 6 to a predetermined maximum value thereby preventing the disc interface pressure from increasing beyond a point where damage will result from overheating.

Due to the increased heat generation, the fluid temperature further increases. When a higher predetermined temperature is reached, high temperature thermostat 63 opens an additional path for fluid to flow through piping 65 to air pressure sensing valve 76 by bypassing low temperature thermostat 64. At the same time, fluid flow through low temperature thermostat 64 to air pressure sensing valve 76 continues.

When the air pressure in storage tank 58 is below a predetermined value, air pressure sensing valve 76 will divert fluid flow immediately to heat exchanger coil 67 through piping 77. However when the air pressure in storage tank 58 is above the predetermined value, air pressure sensing valve 76 will divert fluid flow to thermostat 66.

When fluid temperature is below a relatively high predetermined value, thermostat 66 will divert fluid flow immediately to heat exchanger coil 67 through piping 78. However, when fluid temperature is above the relatively high predetermined value, thermostat 66 will divert fluid flow to booster pump 61 through piping 79. The high fluid temperature in piping 79 causes the fluid temperature sensing device in air flow valve 62 to open air flow valve 62. Compressed air thereby flows from storage cylinder 58 via air piping 60 to the air motor in booster pump 61. Driving power energy previously generated and stored in the form of compressed air is thus returned to the system in the form of driving power for booster pump 61. The booster pump supplements the oil pumping capacity of oil pump 39. A certain amount of the generator's driving power energy, previously used to drive oil pump 39, is now available for conversion to useful heat.

During any period when either or both the air pressure and/or fluid temperature fall below their respective predetermined values, fluid flow is diverted around booster pump 61 by air pressure sensing valve 76 and/or thermostat 66.

As the driving power fluctuates, at useful heat generating levels, the quantity of heat generated fluctuates proportionately by virtue of the inherent energy conversion response reaction. In this response reaction, the rotational velocity of drive shaft 10 is proportional to the driving power input, thereby making the speed of oil pump 39 (which is driven off of drive shaft 10) proportional to the driving power input. This results in the hydraulic pressure, generated by oil pump 39, also being proportional to the driving power input. The friction disc interface pressure, up to a maximum point governed by pressure regulator 44, is proportional to the hydraulic pressure generated at oil pump 39 and therefore the friction disc interface pressure is also proportional to the driving power input. This variable friction disc interface pressure, which is proportional to the driving power input, assures high efficiency heat production proportional to the driving power input.

The volume of fluid flowing through the oil circulation system, and thus flowing through the heating chambers 14, 20 and 30, and heat exchanger coil 67, is also proportional to the hydraulic pressure generated by oil pump 39. This hydraulic pressure, as we have seen, is proportional to both the driving power input and the heat generation in the heating chambers. Therefore, the volume of fluid flow is also proportional to the quantity of heat being generated in the heating chambers.

Thus, in summary, it can be seen that this invention automatically adjusts the friction disc interface pressure for high efficiency operation at any level of driving power input. It automatically limits the friction disc interface pressure to a maximum value to prevent damage due to overheating and it automatically reduces the friction disc interface pressure to zero, if all of the fluid leaks out of the system (because the hydraulic pressure drops to zero).

It can also be seen that in this invention, driving power energy, which is below the minimum power level required to generate useful heat output from the generator, is automatically stored in the form of compressed air energy. When it is efficient to do so, this compressed air energy is automatically used to drive an oil booster pump.

This invention also automatically regulates the volume of heat transfer fluid flow so as to be proportional to the heat being generated in the heating chambers. This is accomplished by powering oil pump 39, which circulates the fluid, off of drive shaft 10.

Finally, as described above, all of the heating chambers 14, 20 and 30 are arranged in a series so that the heat transfer fluid must flow through the heating chambers of each disc assembly and each pressure plate assembly. Fluid flow cannot bypass any of the assemblies.

The above description is of preferred embodiments of the invention. Various alterations and modifications of the invention can be made. For instance, side wall 1 need not be shaped as a cylinder. Analogously, neither the friction discs, the backing plates, nor the pressure plates need be round in shape. Additionally, neither the friction disc assemblies nor the pressure plate assemblies need be made up of individual component parts. It is conceivable that these assemblies could be of unitary construction.

It should also be understood that this invention is not limited to any particular direction of fluid flow. Although the fluid flow direction described above is preferred, the invention could be operated with flow in the reverse direction.

In another variation of the invention, an independent hydraulic or pneumatic pressure generating device (not powered by the generator's driving power) can be used to supply pressure to piston 7, in order to create friction disc interface pressure. This independent pressure generating device may be used, for example, when the friction heat generator is driven by a constant power source.

Another variation of this invention would include an auxiliary oil pump driven by an independent power source. This auxiliary oil pump could be controlled to operate only when the friction heat generator driving power input is at or above a predetermined level. The auxiliary oil pump would assist in circulating the heat transfer fluid.

In a still further variation of the invention, air pressure sensing valve 76 and thermostat 66 could be replaced by a combination air pressure and oil temperature sensing device. It is believed that such a combination device is not presently available, however, it should be relatively easy to design.

Finally, it should be recognized that the subcombinations described above are useful by themselves, and need not be combined with one another to form a workable friction heat generator. For instance, the configuration of the heating chambers 14, 20 and 30, within the friction disc and pressure plate assemblies, which assures that heat transfer fluid will pass through each of said assemblies, is not an essential component of the friction heat generator which automatically varies the friction disc interface pressure in proportion to the driving power input. Likewise, the subcombination for converting low levels of driving power input into compressed gas energy, need not be combined with the subcombination for assuring that heat transfer fluid is circulated through the friction heat generator at a rate proportional to the heat generator's driving power input. None of these subcombinations are dependent upon the inclusion of any of the others in the heat generator. However, the friction heat generator which includes all of these subcombinations is the most efficient and automatic device disclosed.

Other variations and modifications of the invention will occur to those with ordinary skill in the art. It is intended that all such variations and modifications be included within the spirit and scope of the claims below.

What is claimed is:

1. A friction heat generator, comprising:
a casing, with end walls and with a side wall;
a drive shaft for receiving power input, rotatably mounted in the end walls of the casing;

at least one rotatable disc assembly, coaxially mounted on the drive shaft, and keyed to rotate with the drive shaft while being free to slide axially along the drive shaft;

at least one stationary disc assembly, mounted on the side wall, adjacent to one side of and in frictional contact with the rotatable disc assembly, keyed to remain rotationally stationary with respect to the side wall while being free to slide axially along the drive shaft, and surrounding but not keyed to the drive shaft; and means responsive to the generator's driving power input for urging the rotatable disc assembly and the stationary disc assembly closer together as the driving power increases.

2. A friction heat generator, comprising:

a casing, with end walls and with a side wall;

a drive shaft for receiving power input rotatably mounted in the end walls of the casing;

at least one rotatable disc assembly, coaxially mounted on the drive shaft, and keyed to rotate with the drive shaft while being free to slide axially along the drive shaft;

at least one stationary disc assembly, mounted on the side wall, adjacent to one side of and in frictional contact with the rotatable disc assembly, keyed to remain rotationally stationary with respect to the side wall while being free to slide axially along the drive shaft, and surrounding but not keyed to the drive shaft; and means responsive to the generator's driving power input for varying the interface pressure between the rotatable disc assembly and the stationary disc assembly.

3. The invention of claim 1 or 2, wherein said means includes means for generating fluid pressure in proportion to the heat generator's driving power input.

4. The invention of claim 3, wherein said generating means comprises an oil pump, powered by the drive shaft, for generating hydraulic pressure.

5. The invention of claim 4, wherein said means, responsive to the generator's driving power input, includes:

a pressure plate assembly, mounted on the side wall, adjacent to and in frictional contact with the other side of the rotatable disc assembly, keyed to remain rotationally stationary with respect to the side wall while being free to slide axially along the drive shaft and surrounding but not keyed to the drive shaft; and piston means, hydraulically communicating with said oil pump, for exerting axial pressure on the pressure plate.

6. The invention of claim 5, wherein said means, responsive to the generator's driving power input, further includes a pressure regulator, which blocks the hydraulic pressure to the piston means until a predetermined minimum value of hydraulic pressure is reached, and which allows hydraulic pressure to the piston means to reach a value not greater than a predetermined maximum hydraulic pressure.

7. The invention of claim 6, further comprising a second rotatable disc assembly, coaxially mounted on the drive shaft, keyed to rotate with the drive shaft while being free to slide axially along the drive shaft, with one side adjacent to and in frictional contact with the stationary disc assembly, such that the stationary disc assembly is sandwiched between the two rotatable disc assemblies; and a second pressure plate assembly, mounted on the side wall, adjacent to and in frictional contact with the other side of the second rotatable disc assembly, keyed to remain rotationally stationary with respect to the side wall while being free to slide axially along the drive shaft, and surrounding but not keyed to the drive shaft.

8. A friction heat generator for heating fluids comprising:

a casing, with end walls and a side wall, said casing having a fluid inlet and a fluid outlet;

a drive shaft, rotatably mounted in the end walls of the casing and adapted to be driven by a power source;

at least one rotatable disc assembly, coaxially mounted on the drive shaft, and keyed to rotate with the drive shaft, said assembly having openings therein communicating with the inlet for receiving fluid, said openings being so configured as to promote the circulation therethrough and the forcible discharge therefrom of fluid as the assembly rotates;

at least one stationary disc assembly, mounted on the side walls, adjacent to and in frictional contact with the rotatable disc assembly, keyed to remain rotationally stationary with respect to the side walls, and surrounding, but not keyed to, the drive shaft, said assembly having openings therein for receiving fluid discharged from the rotatable disc assembly, said openings being so configured as to conduct the fluid therethrough and pass it towards the fluit outlet only; and means for preventing fluid discharged from each rotatable disc assembly from bypassing the openings of its associated adjacent stationary disc assembly, whereby fluid within the generator is caused to flow generally from the fluid inlet, through each and every disc assembly and to the fluid outlet as the shaft rotates.

9. The invention of claim 8, wherein each rotatable disc assembly comprises:

a rotatable inlet friction disc, with openings therein communicating with the fluid inlet for receiving fluid;

a rotatable discharge friction disc; and a rotatable backing plate, sandwiched between the rotatable friction discs, with openings therein communicating with the openings in the rotatable inlet friction disc for receiving fluid, said openings being so configured as to promote the circulation therethrough and the forcible discharge therefrom of fluid as the assembly rotates.

10. The invention of claim 9, wherein each stationary disc assembly comprises:

a stationary inlet friction disc, with openings therein for receiving fluid discharged from the rotatable disc assembly;

a stationary discharge friction disc, with openings for discharging fluid from within the stationary disc assembly to the fluid outlet only; and a stationary backing plate, sandwiched between the stationary friction discs, having openings therein for receiving fluid passing through the stationary inlet friction disc, said openings being so configured as to permit such fluid to pass therethrough and into the openings in the stationary discharge friction disc only.

11. The invention of claim 10, wherein each rotatable discharge friction disc is tightly fit around the shaft, thereby preventing the transverse flow of fluid along the shaft, and is spaced apart from the side wall of the casing, thereby permitting the transverse flow of fluid along the side wall.

12. The invention of claim 11, wherein the openings in the stationary inlet friction disc are along the circumference of the disc.

13. The invention of claim 12, wherein the openings in the backing plates include heating chambers in the form of radial channels.

14. The invention of claim 13, wherein said radial channels are offset.

15. The invention of claim 13, wherein said radial channels are curved.

16. A friction heat generator for heating fluids comprising:
a casing, with end walls and a side wall, said casing having a fluid inlet and a fluid outlet;
a drive shaft, rotatably mounted in the end walls of the casing and adapted to be driven by a power source;
a first means for generating fluid flow in proportion to the heat generator's driving power input; and
a second means for communicating the fluid flow, generated by the first means, to the fluid inlet;
whereby the fluid flow through the heat generator will be at a rate directly proportional to the driving power input.

17. The invention of claim 16, wherein the first means, for generating fluid flow, comprises an oil pump powered by the drive shaft; and wherein the second means, for communicating the fluid flow, comprises hydraulic piping.

18. In combination with a friction heat generator for heating fluids, said friction heat generator adapted to be driven by a power source;
gas compression means, powered by the heat generator's driving power;
compressed gas storage means, pneumatically communicating with the gas compression means, for the storage of compressed gas generated by the gas compression means; and
conversion means for converting compressed gas energy to mechanical energy.

19. The invention of claim 18, further comprising:
first regulating means, to automatically deactivate the gas compression means when the heat generator's driving power reaches a preselected level; and
second regulating means connected between the storage means and the conversion means to allow compressed gas to flow from the storage means to the conversion means only when both the pressure in the storage means and the temperature of the fluid, heated by the generator, are above predetermined values.

20. The invention of claim 19 wherein:
the friction heat generator has a drive shaft with a cam thereon;
the gas compression means comprises an air compressor, with a piston driven by the cam on the drive shaft; and
the compressed gas storage means comprises a storage cylinder.

21. The invention of claim 20, wherein the first regulating means comprises:
a rocker arm, one end of which is for lifting the air compressor piston off of the cam;
a regulator piston, for depressing the other end of the rocker arm;
an oil pump, powered by the drive shaft, for generating hydraulic pressure in proportion to the generator's driving power input; and
a hydraulic pressure regulator for communicating hydraulic pressure from the oil pump to the regulator piston when the preselected driving power level is reached.

22. The invention of claim 21, wherein
the conversion means comprises an air motor; and
the second regulating means comprises oil temperature and air pressure sensing devices for communicating pneumatic pressure from the storage cylinder to the air motor only when both the pressure in the storage cylinder and the temperature of the fluid, heated by the generator, are above predetermined values.

23. The invention of claim 22, further comprising an auxiliary oil pump, powered by the air motor, hydraulically communicating with the fluid heated by the generator for promoting the flow of fluid through the generator.

24. A friction heat generator for heating fluids comprising:
a casing with end walls and with a side wall, said casing having a fluid inlet and a fluid outlet;
a drive shaft, rotatably mounted in the end walls of the casing and adapted to be driven by a power source;
at least one rotatable disc assembly, coaxially mounted on the drive shaft, and keyed to rotate with the drive shaft while being free to slide axially along the drive shaft, said assembly having openings therein communicating with the inlet for receiving fluid, said openings being so configured as to promote the circulation therethrough and the forcible discharge therefrom of fluid as the assembly rotates;
at least one stationary disc assembly, mounted on the side walls, adjacent to one side of and in frictional contact with the rotatable disc assembly, keyed to remain rotationally stationary with respect to the side wall while being free to slide axially along the drive shaft, and surrounding but not keyed to the drive shaft, said assembly having openings therein for receiving fluid discharged from the rotatable disc assembly, said openings being so configured as to cause such fluid to pass therethrough and to the fluid outlet only;
whereby fluid within the generator is caused to flow generally from the fluid inlet, through the disc assemblies and to the fluid outlet as the shaft rotates;
means responsive to the generator's driving power input for urging the rotatable disc assembly and the stationary disc assembly closer together as the driving power increases;
a first means for generating fluid flow in proportion to the heat generator's driving power input;
a second means for communicating the fluid flow, generated by the first means, to the find inlet;

whereby the fluid flow through the heat generator will be at a rate directly proportional to the driving power input;

gas compression means, powered by the heat generator's driving power;

compressed gas storage means, pneumatically communicating with the gas compression means, for the storage of compressed gas generated by the gas compression means;

first regulating means, to automatically deactivate the gas compression means when the heat generator's driving power reaches a preselected level;

conversion means for converting compressed gas energy to mechanical energy; and second regulating means connected between the storage means and the conversion means to allow compressed gas to flow from the storage means to the conversion means only when both the pressure in the storage means and the temperature of the fluid, heated by the heat generator, are above predetermined values.

25. The invention of claim 24, wherein the means for urging the disc assemblies closer together, the first means for generating fluid flow and the first regulating means all include an oil pump, powered by the drive shaft, for generating hydraulic pressure in proportion to the generator's driving power input.

26. The invention of claim 25, wherein:
the drive shaft has a cam thereon, located on the drive shaft to one side of all the disc assemblies;
the gas compression means comprises an air compressor, with an air compressor piston driven by the cam on the drive shaft; and
the compressed gas storage means comprises a storage cylinder.

27. The invention of claim 26, wherein said means for urging the disc assemblies closer together further includes:
a pressure plate assembly, mounted on the side wall, adjacent to and in frictional contact with the other side of the rotatable disc assembly, keyed to remain rotationally stationary with respect to the side wall while being free to slide axially along the drive shaft and surrounding but not keyed to the drive shaft; and
axial piston means, hydraulically communicating with said oil pump, for exerting axial pressure on the pressure plate; and
wherein the first regulating means further includes:
a rocker arm, one end of which is for lifting the air compressor piston off of the cam;
a regulator piston, for depressing the other end of the rocker arm; and
wherein both the means for urging the disc assemblies closer together and the first regulating means include a hydraulic pressure regulator for communicating hydraulic pressure from the oil pump to both the axial piston means and the regulator piston when the driving power reaches the preselected level and which allows this hydraulic pressure to reach a value not greater than a predetermined maximum value.

28. The invention of claim 27, wherein each rotatable disc assembly comprises:
a rotatable inlet friction disc, with openings therein communicating with the fluid inlet for receiving fluid;
a rotatable discharge friction disc; and
a rotatable backing plate, sandwiched between the rotatable friction disc, with openings therein communicating with the openings in the rotatable inlet friction disc for receiving fluid, said openings being so configured as to promote the circulation therethrough and the forcible discharge therefrom of fluid as the assembly rotates; and wherein each stationary disc assembly comprises:
a stationary inlet friction disc, with openings therein for receiving fluid discharged from the rotatable disc assembly;
a stationary discharge friction disc, with openings for discharging fluid from within the stationary disc assembly to the fluid outlet only; and
a stationary backing plate, sandwiched between the stationary friction discs, having openings therein for receiving fluid passing through the stationary inlet friction disc, said openings being so configured as to cause such fluid to pass therethrough and into the openings in the stationary discharge friction disc only; and wherein:
the conversion means comprises an air motor; and
the second regulating means comprises oil temperature and air pressure sensing devices for communicating pneumatic pressure from the storage cylinder to the air motor only when both the pressure in the storage cylinder and the temperature of the fluid, heated by the generator, are above predetermined values.

29. The invention of claim 28:
wherein each rotatable discharge friction disc is tightly fit around the shaft, thereby preventing the transverse flow of fluid along the shaft, and is spaced apart from the side wall of the casing, thereby permitting the transverse flow of fluid along the side wall;
wherein the openings in the stationary inlet friction disc are along the circumference of the disc;
wherein the openings in the backing plates include heating chambers in the form of radial channels; and
further comprising an auxiliary oil pump, powered by the air motor, hydraulically communicating with the fluid heated by the generator for promoting the flow of fluid through the generator.

30. The invention of claim 29, wherein said radial channels are offset.

31. The invention of claim 30, wherein said radial channels are curved.

32. A method of converting mechanical energy into heat energy, comprising:
rotating, by the use of driving power input, at least one rotatable disc assembly, relative to at least one stationary disc assembly; and
pressing each rotatable disc assembly against each stationary disc assembly with an amount of pressure which is directly proportional to the driving power input.

33. The invention of claim 32, wherein the step of pressing includes:
generating fluid pressure in proportion to the driving power input; and
transmitting the fluid pressure to the disc assemblies so as to press said assemblies together.

34. The invention of claim 33, wherein the step of generating fluid pressure comprises:
generating hydraulic pressure.

35. The invention of claim 34, wherein the step of pressing includes:
blocking the hydraulic pressure to the disc assemblies until a predetermined minimum value of hydraulic pressure is reached; and
limiting the value of the hydraulic pressure to the disc assemblies to a predetermined maximum hydraulic pressure.

36. A method of converting mechanical energy into heat energy, comprising:
rotating at least one rotatable disc assembly, relative to at least one stationary disc assembly;
pressing each rotatable disc assembly against each adjacent stationary disc assembly; and
directing heat transfer fluid sequentially through the series of disc assemblies, such that substantially all the fluid entering the series must pass sequentially through each disc assembly and then must be discharged from the series of disc assemblies.

37. The invention of claim 36, wherein the step of sequentially directing the heat transfer fluid includes:
directing the heat transfer fluid radially outward from the center of each rotatable disc assembly; and then
directing the fluid transversely to only one adjacent stationary disc assembly; and then
directing the fluid radially inward into this adjacent stationary disc assembly; and then
directing the fluid transversely to the next adjacent rotatable disc assembly in the series.

38. A method of converting mechanical energy into heat energy, comprising:
rotating, by the use of driving power input, at least one rotatable disc assembly, relative to at least one stationary disc assembly;
pressing each rotatable disc assembly against each adjacent stationary disc assembly; and
circulating heat transfer fluid through each disc assembly at a rate proportional to the driving power input.

39. The invention of claim 38, wherein the step of circulating includes:
generating fluid flow in proportion to the driving power input; and
communicating the fluid flow to the disc assemblies for the circulation therethrough.

40. A method of converting mechanical energy into heat energy, comprising:
rotating, by the use of driving power input, at least one rotatable disc assembly, relative to at least one stationary disc assembly;
pressing each rotatable disc assembly against each adjacent stationary disc assembly;
circulating heat transfer fluid through each disc assembly;
compressing a gas;
storing said compressed gas; and
converting the energy stored in said compressed gas into mechanical energy.

41. The invention of claim 40,
wherein the step of compressing a gas is discontinued while the driving power input is above a preselected level; and
wherein the step of converting compressed gas energy to mechanical energy occurs only when both the pressure of the stored gas and the temperature of the heat transfer fluid are above predetermined values.

42. The invention of claim 41, further comprising:
converting the mechanical energy into hydraulic pressure; and
communicating said hydraulic pressure to the heat transfer fluid to assist in the circulation thereof.

43. A method of converting mechanical energy into heat energy, comprising:
rotating, by the use of driving power input, at least one rotatable disc assembly, relative to at least one stationary disc assembly;
pressing each rotatable disc assembly against each stationary disc assembly with an amount of pressure which is directly proportional to the driving power input;
directing heat transfer fluid sequentially through the series of disc assemblies, such that fluid entering the series must pass through each disc assembly and then must be discharged from the series of disc assemblies;
circulating heat transfer fluid through each disc assembly at a rate proportional to the driving power input;
compressing a gas;
storing said compressed gas; and
converting the energy stored in said compressed gas into mechanical energy.

44. The invention of claim 43,
wherein the steps of pressing and circulating include generating hydraulic pressure; and
wherein the step of pressing further includes transmitting the fluid pressure to the disc assemblies so as to press said assemblies together; and
wherein the step of circulating heat transfer fluid further includes communicating the hydraulic pressure to the fluid flow through the disc assemblies for the circulation therethrough; and
wherein the step of compressing a gas is discontinued while the hydraulic pressure is above a preselected level; and
wherein the step of converting compressed gas energy to mechanical energy occurs only when both the pressure of the stored gas and the temperature of the heat transfer fluid are above predetermined values.

45. The invention of claim 44,
wherein the step of pressing includes:
blocking the hydraulic pressure which is transmitted to the disc assemblies so as to press them together until a predetermined minimum value of hydraulic pressure is reached; and
limiting the value of the hydraulic pressure, which is transmitted to the disc assemblies so as to press them together, to a predetermined maximum hydraulic pressure; and
wherein the step of sequentially directing heat transfer fluid includes:
directing the heat transfer fluid radially outward from the center of each rotatable disc assembly; and then
directing the fluid transversely to only one adjacent stationary disc assembly; and then
directing the fluid radially inward into this adjacent stationary disc assembly; and then
directing the fluid transversely to the next adjacent rotatable disc assembly in the series; and
further comprising:
converting the mechanical energy, which originated from the compressed gas energy, into hydraulic pressure; and
communicating said hydraulic pressure, which originated from the mechanical energy, to the heat transfer fluid to assist in the circulation thereof.

* * * * *